Aug. 1, 1967     SHIGERU MAEHARA ET AL     3,333,839
APPARATUS FOR RECOVERING UNBURNED GASES ISSUED FROM METAL
REFINING FURNACES
Filed Sept. 29, 1964     2 Sheets-Sheet 2
FIG. 2
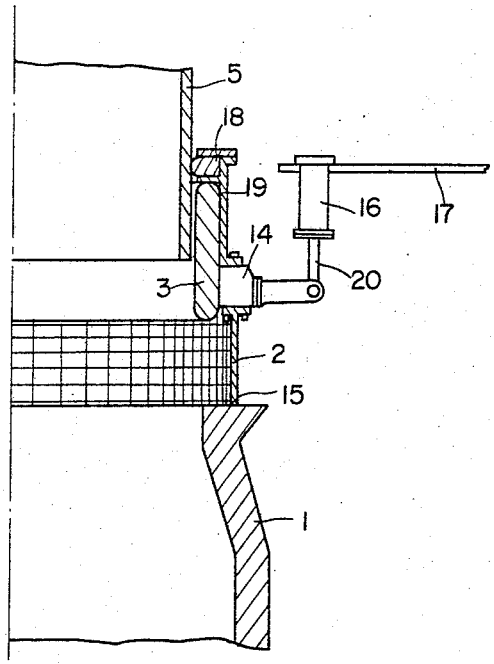
FIG. 3
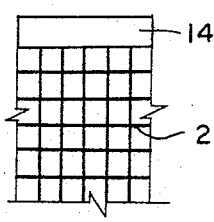
FIG. 4     FIG. 5
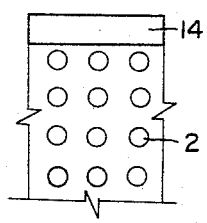     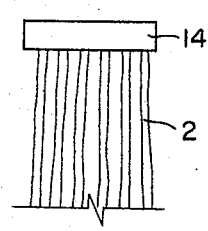
INVENTORS.
Shigeru Maehara
Isoji Igarashi
BY Wenderoth, Lind
and Ponack,
Attorneys

United States Patent Office 3,333,839
Patented Aug. 1, 1967

3,333,839
APPARATUS FOR RECOVERING UNBURNED GASES ISSUED FROM METAL REFINING FURNACES
Shigeru Maehara and Isoji Igarashi, Kitakyushu, Japan, assignors to Yawata Iron & Steel Co., Ltd. and Yokoyama Engineering Co., Ltd., both of Tokyo, Japan, both corporations of Japan
Filed Sept. 29, 1964, Ser. No. 400,066
Claims priority, application Japan, Oct. 2, 1963, 38/53,184
2 Claims. (Cl. 266—35)

This invention relates to apparatus for recovering in an unburned state gases issued from metal refining furnaces.

When steel is refined by oxygen blowing in a metal refining furnace, for example, an oxygen top-blowing converter, a large amount of gases high in CO content will be produced. An attempt to recover such produced gases as unburned and to effectively utilize them has been already industrialized.

For example, there is suggested a method wherein gases produced in an oxygen top-blowing converter are introduced into a cooler tightly mounted on the top part of the converter and are recovered in a gas holder after dust having been removed. However, if air enters the produced gases through the clearance part between the top part of said converter and the cooler, there will be a danger of explosion. Therefore, there are suggested various means of preventing the entry of air.

An object of the present invention is to provide an apparatus for safely recovering gases in an unburned state with a refractory shielding member provided in the clearance part between a cooler for containing waste gases issued from a metal refining furnace and said metal refining furnace.

Other objects of the present invention will be clear from the following explanation and the accompanying drawings.

FIGURE 2 is a sectioned view of the essential part of an apparatus for recovering gases issued from an oxygen top-blowing converter provided with the apparatus of the present invention.

FIGURES 3 to 5 illustrate respective examples of the shielding member to be used in the present invention.

Figure 1:
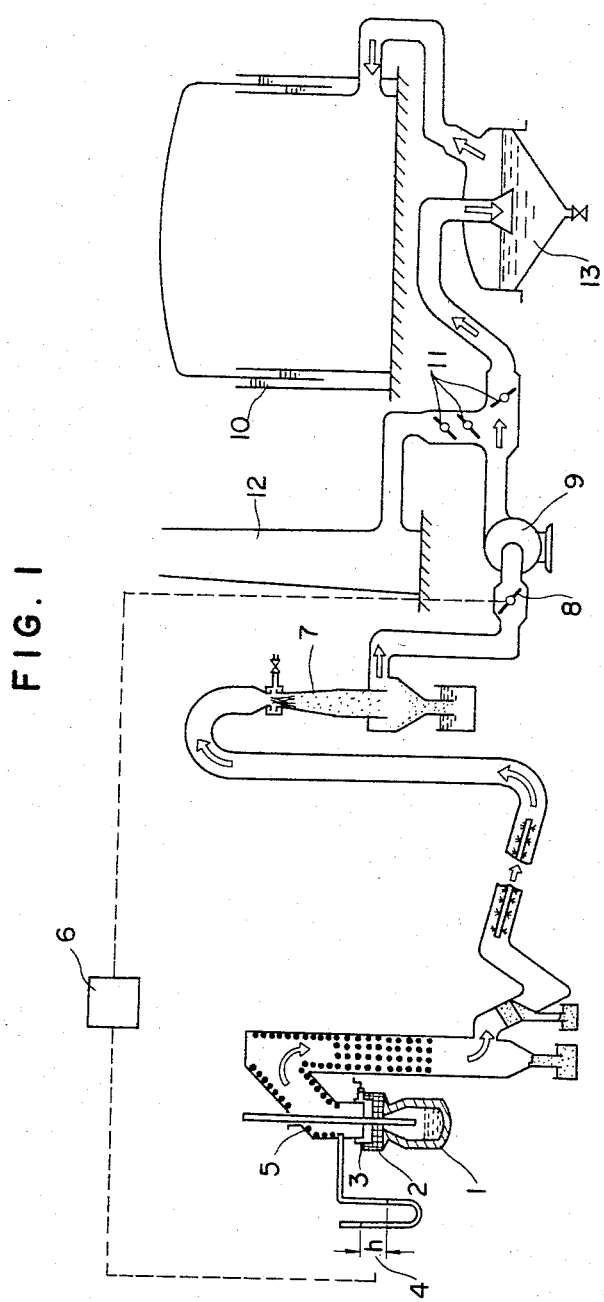
FIGURE 1 is a general view for working the method of the present invention.

The control of the pressure within the gas cooler is to be carried out by automatically controlling the operation of a gas flow regulating valve provided in a gas conduit pipe in the recovering system and the detected valve of the pressure within the gas cooler. However, the refinement in an oxygen top-blowing converter is carried out with a cycle of 20 to 30 minutes, causing a pulsating phenomenon in the pressure within the cooler, whereby it is very difficult to stabilize the pressure within the cooler.

When controlling the pressure within the cooler in the gas recovering system by regulating the opening degree of the gas flow regulating valve provided in a flue, the pressure within the gas cooler will be subjected to such a great fluctuation with the lapse of the oxygen blowing time as the control of the pressure is feared of becoming impossible, if the furnace top part and the cooler are to be so closely connected with each other as to eliminate the clearance between them.

On the contrary, if said clearance is made too large, the sensitivity of the recovery system of the pressure within the cooler will be reduced, resulting in deteriorating the precision of the pressure control, because due to too large clearance the leakage of the produced gas and the entry of air into the recovery system resulted from the fluctuation in the pressure within the cooler will become too much that said fluctuation in the pressure will substantially be eliminated on account of an immediate communication with the open air.

In carrying out the refinement in a converter by blowing oxygen therein, if a fluctuation of more than 20 mm. in water column is given to the pressure within the cooler, surging will be caused to the blower, whereby the control of the pressure within the cooler will be difficult.

As a result of researches made by the inventors on an arrangement for stably recovering gases, while maintaining the sensitivity of the operation of a gas flow regulating valve provided in a gas conduit in view of the above mentioned facts, the inventors came to know that it is effective to provide a body, which is resistant to the fluctuation in the pressure of gas recovered, on the entire periphery of the clearance part between the top part of the converter and the cooler.

Thus, the present invention relates to an apparatus for recovering unburned gases issued from an oxygen top-blowing converter comprising a cooler set in the top part of the oxygen top-blowing converter and containing cooling water pipes, a mechanism for sucking unburned gases received in said cooler by means of a blower through a dust collector in a gas conduit pipe and storing them in a gas holder, a gas flow regulating valve for regulating the flow rate of the gases in said gas conduit pipe, a vertically movable hood in close contact with said cooler and a ventilative shielding member secured to said hood and in close contact with the top part of the converter.

That is to say, the apparatus according to the present invention for recovering unburned gases is characterized by that the clearance part between the top part of a furnace and a gas recovering system, for example, a hood part mounted tightly on said top part of the furnace is covered with a refractory shielding member, which is ventilative on the entire surface thereof.

The shielding member to be used in the present invention may be a refractory metal screen, metal plate having small holes or refractory curtain.

As described above, the shielding member to be used in the present invention is ventilative on the entire surface, but its ratio of the open area should be 0.1 to 0.8 or preferably 0.6. By the above mentioned ratio of the open area is meant a ratio of the total area of the parts of the shielding member ventilated with the outside air to the total area of the shielding member used on the entire periphery of the above mentioned clearance part.

The clearance part between said top part of the converter and the cooler should be such as will not interfere with the rotation of the converter or, for example preferably 30 to 50 cm.

The present invention shall be detailed in the following with reference to the drawings.

In FIGURE 1, 1 is a converter, 2 is a shielding metal screen, 3 is a vertically movable hood, 4 is a pressure difference (in water column) between the detected and predetermined valve in the cooler, 5 is a cooler, 6 is an automatic controlling device, 7 is a dust collector, 8 is a gas flow regulating valve, 9 is a suction blower, 10 is a gas holder, 11 is a three-way change-over valve, 12 is a gas discharge tower and 13 is a water-sealed valve.

The differential pressure 4 between the detected and predetermined valve in the cooler is represented by $\Delta h$, is set in the flow regulating valve 8 and the automatic controlling system, whereby it is adjusted so as to be a positive pressure of less than several mm. in water column. The cleaned waste gas delivered from the suction blower 9 is discharged into the atmosphere through the gas discharge tower 12 by the three-way change-over valve 11 during the initial and final periods of blowing in which the produced gases are low in CO concentration and consequently are less valuable. The valuable gas high in CO concentration obtained during the middle time of blowing is stored in the gas holder 10 by switching the three-way change-over valve 11. That is to say, the waste gas issued from the converter is first received in the cooler, in which it is cooled from the gas temperature of 1450° C. at the time when being received down to about 400° C. This cooled gas is then led to the dust collector, through which more than 99% of dust are removed and reaches the suction blower. The thus cleaned waste gas is pressed into the gas holder by means of the blower which has also a feeding function when the gas is to be recovered.

The essential part of the present invention shall now be explained with reference to FIGURE 2.

In FIGURE 2, the gas cooler 5 is provided just above the mouth of the converter body 1 and has the movable hood 3 for adjusting the distance from the mouth of the converter at the lower part of said cooler.

The movable hood 3 may be of a known water-sealed structure.

A supporting frame 19 supports a packing 18 and the movable hood 3, is connected to a supporting base 14 and is further connected at one end with a piston 20 of an oil pressure cylinder 16 secured to a fitting base 17.

Thus, by the operation of said cylinder 16, the distance between the movable hood 3 and the converter mouth may be adjusted.

Further, at the lower part of said supporting base 14, the screen-shaped shielding member 2 is hung over the entire periphery of the clearance part between the movable hood 3 and the converter top through a proper frame and is in close contact at its lower end with the converter body 1 to form a close contact part 15 for which a packing may be used as required.

FIGURES 3 to 5 illustrate embodiments of the shielding member.

FIGURE 3 shows a screen-shaped member. FIGURE 4 shows a metal plate provided with small holes, and FIGURE 5 a refractory curtain-shaped member. With any of them, the object of the present invention can be attained.

In the above mentioned waste gas recovering apparatus, the success of the recovery of the waste gas depends on the control of the differencial pressure $\Delta h$ in the cooler by the gas flow regulating valve 8. If the action of the gas flow regulating valve to follow the fluctuation of the differential pressure $\Delta h$ is reduced by any cause, the control of the pressure within the cooler will be disturbed, the waste gas will leak out through the open parts between the converter and the skirt or the open air will enter the cooler. However, the waste gas should be fully prevented from leaking out, because CO gas is noxious, as is generally known, and also the unusual entry of the open air should be prevented on account of a danger of causing the explosion of the CO gas.

According to the present invention, as the entire periphery of the clearance part between the top part of the converter and the hood is covered with the above mentioned shielding metal screen, while controlling the pressure within the cooler to be a positive pressure of about 0.5 mm. in water column, the fluctuation is swept away into the open air through said shielding metal screen. The gas, which has flowed out burns in the open air, forming black smoke near the wall of the converter and the shielding metal screen.

And, when the pressure of the above mentioned recovered gas unexpectedly fluctuates to be a negative one, the open air will be introduced through the shielding metal screen, whereby the negative pressure will be eliminated near the metal screen. Therefore, by providing the shielding member, it is possible to control the fluctuation of the pressure in the converter or in the cooler to be of the minimum value in the clearance part.

As the pulsating phenomenon in the cooler is controlled, the blower can be operated stably and the fear of surging can be prevented.

As a result of experiments, the ratio of the open area of the shielding member should be 0.1 to 0.8 or preferably 0.6 as mentioned above.

The present invention has been described in the above mostly on the recovery of unburned gases issued from an oxygen top-blowing converter. When the shielding member is used according to the present invention, the clearance in the top part of the converter will not have to be tightly sealed with an inert gas as in the conventional method. However, in view of securing the safety of the operation an inert gas, for instance, nitrogen gas may be also used in order to make the atmosphere near the wall of the converter poor in oxygen by diffusing the nitrogen gas on the entire periphery of the above mentioned clearance part. In this case, even if a part of the recovered gas will leak out, it will be able to be favorably diluted by said nitrogen gas.

What is claimed is:

1. In an apparatus for recovering unburned gases issuing from an oxygen top-blowing converter and having a cooler adapted to be positioned above an oxygen top-blowing converter and containing cooling water pipes, a dust collector connected to said cooler, a gas conduit pipe connected to said dust collector and adapted to be connected to a gas holder, a suction means in said gas conduit pipe, and a gas flow regulating valve in said pipe for regulating the flow rate of the gases in said conduit pipe, the improvement comprising a vertically movable hood in close contact with said cooler, and a refractory shielding member depending from said movable hood and extending completely around the periphery of the hood and adapted to come in close contact with the top of the converter, said shielding member having openings therein over the entire surface and the ratio of the total area of the openings to the total area of the shield being between 0.1 to 0.8.

2. An apparatus as claimed in claim 1 in which the ratio of the total area of the openings to the total area of the shield is about 0.6.

References Cited

UNITED STATES PATENTS

| 2,837,790 | 6/1958 | Rozian | 22—57.2 |
| 3,111,400 | 11/1963 | Hoff | 75—60 X |
| 3,173,489 | 3/1965 | Okaniwa et al. | 266—35 X |

J. SPENCER OVERHOLSER, *Primary Examiner.*

E. MAR, *Assistant Examiner.*